United States Patent [19]

Krambrock

[11] Patent Number: 4,747,524
[45] Date of Patent: May 31, 1988

[54] DEVICE FOR METERED HANDLING OF BULK MATERIALS

[75] Inventor: Wolfgang Krambrock, Vogt, Fed. Rep. of Germany

[73] Assignee: AVT Anlagen-und Verfahrenstechnik GmbH, Vogt, Fed. Rep. of Germany

[21] Appl. No.: 896,275

[22] Filed: Aug. 14, 1986

[30] Foreign Application Priority Data

Aug. 16, 1985 [DE] Fed. Rep. of Germany ....... 3529480
Dec. 13, 1985 [DE] Fed. Rep. of Germany ....... 3544014

[51] Int. Cl.$^4$ .................. B65G 53/46; G01F 11/10
[52] U.S. Cl. ..................... 222/636; 222/345; 222/370; 222/557; 406/66; 406/120
[58] Field of Search .......... 222/342, 345, 346, 367, 222/370, 630, 636, 637, 302, 561, 557; 221/265; 406/63, 66, 68, 64, 67, 120

[56] References Cited

U.S. PATENT DOCUMENTS

| | | | |
|---|---|---|---|
| 1,673,155 | 6/1928 | Nielsen | 222/370 |
| 1,901,203 | 3/1933 | Thompson | 406/63 X |
| 2,262,094 | 11/1941 | Burt | 406/66 |
| 2,637,539 | 5/1953 | Crom | 406/66 X |
| 2,766,911 | 10/1956 | Greaves et al. | 222/636 X |
| 2,984,521 | 5/1961 | McCulloch | 406/120 X |
| 3,288,537 | 11/1966 | Hitch | 406/120 X |
| 3,797,890 | 3/1974 | Walters | 406/67 X |
| 4,599,015 | 7/1986 | Krambrock | 222/148 X |
| 4,613,058 | 9/1986 | Conger | 222/370 X |

FOREIGN PATENT DOCUMENTS

432360  9/1967  Switzerland .............. 406/63

Primary Examiner—Joseph J. Rolla
Assistant Examiner—Kevin P. Shaver
Attorney, Agent, or Firm—Spencer & Frank

[57] ABSTRACT

A device for metering bulk materials with a vertical axis having a rotor featuring radially extending paddles about the vertical axis, and a cover plate, constructed to prevent especially coarse particle materials from being scraped or squashed between the rotor and the cover plate. For this purpose a ring segment type opening is provided in the cover plate, and a recess is provided in the under surface of the cover adjacent the opening to provide a space for producing material slopes underneath, whereby the limiting edge between the inlet opening of the cover plate and the rotor paddles forms an acute angle.

10 Claims, 6 Drawing Sheets

DEVICE FOR METERED HANDLING OF BULK MATERIALS

BACKGROUND OF THE INVENTION

1. Field of the Invention

The invention involves a device for metering bulk material which includes a rotor with radial paddles, which rotates around a vertical axle in a cylindrical housing, the housing having a cover plate on its top in which openings are provided for bulk material supply, whereby the rotor has at least one discharge opening following on for bulk material discharge.

2. Description of the Related Art

Bulk materials may be discharged in a metered way with the aid of generally known rotary valves from one area of any desired pressure into an area with either equal, higher or lower pressure. For this the pockets formed between the radial paddles of a rotor rotating around a horizontal axle in a cylindrical housing are filled with bulk material from the top and emptied after a rotation of approximately 180° on the underside.

In the case of another known rotary valve (disclosed in West German Patent Application No. P 34 25 895.7) with a rotor which rotates around a verticle axle, the bulk material is supplied to the rotor chambers via a segment formed opening, to then be emptied through a discharge opening which is arranged eccentrically in the housing bottom after a rotation of approximately 180°.

The advantage of the rotary valves with a vertical axle is that they have a large inlet cross section and are therefore also suitable for materials which are not free-flowing and which form bridges. Furthermore the centrifugal force does not act against the flow of the supplied material as opposed to the rotary valves with a horizontal axle.

A disadvantage of the known rotary valves is that especially when metering coarse particle materials, such as plastic pellets for example, particles may become trapped and scraped between the rotor paddles and the edge of the eccentric opening which is directed against the paddle movement. Furthermore, the edges of the rotor paddles are damaged to no little extent due to the scraping and squashing of particles.

A further disadvantage of the known rotary valves with a vertical axle is that the centrifugal force in the case of a discharge opening directed vertically downwards impedes product discharge to such an extent that a part of the material thrown against the cylindrical wall of the housing cannot be discharged from the pockets at all.

In the case of the known rotary valve with verticle axle and discharge opening arranged radially in the housing (disclosed in West German Application No. P 34 25 895.7), the device may only be used in connection with a pneumatic conveying unit. It is, however, often practical to connect several metering units with a combined conveying line, which is practically impossible with the unit already mentioned, as the pneumatically transported material has to be transported through the rotors of the subsequent units, whereby an extremely high pressure loss occurs and plugging of one of the pipe cross sections which lead through the rotary valves may easily occur.

SUMMARY OF THE INVENTION

The invention has as an object to provide a rotary valve with a vertical axle, with the aid of which coarse particle materials may be metered, to a great extent without scraping and squashing the individual particles, while complete discharge of the individual rotor chambers is possible with the support of the centrifugal force both in an open or enclosed area and also in a pneumatic conveying line. Furthermore, it should be possible to connect several rotary valves to a combined pneumatic conveying line.

This object is met in accordance with the invention (1) by providing the cover plate of the cylindrical housing with an opening in the form of a segment of an annular ring (hereinafter ring "segment"), the outer diameter D of which is almost equal to the diameter D' of the rotor and the inner diameter d of which is larger than that of the rotor hub diameter d', so that in the region of the discharge of the radially extending rotor paddles from the opening, a limiting edge opposing the paddle movement and the paddles at an acute angle $\alpha$ with respect to the radial extent of the paddles is included, (2) by providing the underside of the cover plate with an undercut recess in the region of the ring segment for formation of a gap between the underside of the cover plate and the top edge of the rotor paddles, and (3) by providing that the surface normal of the discharge opening for bulk material discharge in the cylindrical housing is parallel to the vertical axis or forms an angle of up to 90° with this.

Due to the development of the device according to the invention the disadvantages described in the introductory section of the known device may be avoided. Especially coarse particle materials may be passed on without extensive scraping or squashing of the particles in a metered manner. Furthermore, the invention enables complete discharge of the individual rotor chambers to take place using the centrifugal force also in the case of rotary valves with vertical axes, whereby conveying may be carried out both in an open or enclosed area or in a pneumatic conveying line.

BRIEF DESCRIPTION OF THE DRAWINGS

Further characteristics and advantages relevant to the invention will be apparent from the construction examples detailed below with reference to the drawings in which.

DESCRIPTION OF THE PREFERRED EMBODIMENT

The device shown in FIGS. 1 to 4 consists of a rotor with a hub 1 and radial paddles 2, which is mounted rigidly on a drive shaft 4 along the center axis of the cylindrical housing 3. The housing 3 is for instance connected to the outlet of a storage hopper 6 for bulk materials by means of a flange 5. Above the rotor the cover plate 7 is situated with a ring segment formed opening 8. The clearing scraper 9 which rotates with the rotor prevents material from being deposited on the closed side of the cover plate. On the floor 10 of the housing 3 there is a discharge opening 11, through which the bulk material is in the pocket of the rotor is emptied. The cover plate 7 has a recess 12, by means of which a gap is formed in the region of the ring segment shaped inlet opening 8 between the top edges of the rotor paddles 2 and the underside of the cover plate 7. The inner diameter d of the ring segment shaped inlet opening 8 is larger than the diameter of the pipe hub 1. For this reason the bulk material which is to be metered cannot completely fill the pockets limited by the paddles 2 and the hub 1, as a natural material slope 13 occurs. The space 14 which then occurs remains during the rotor rotation since, apart from the gravitational force, only the radial centrifugal force directed outwards acts on the material in the pockets. Therefore, the surplus material in the pockets may be swept in the direction of the space 14 by the edge of the inlet opening 15.

Figure 5:
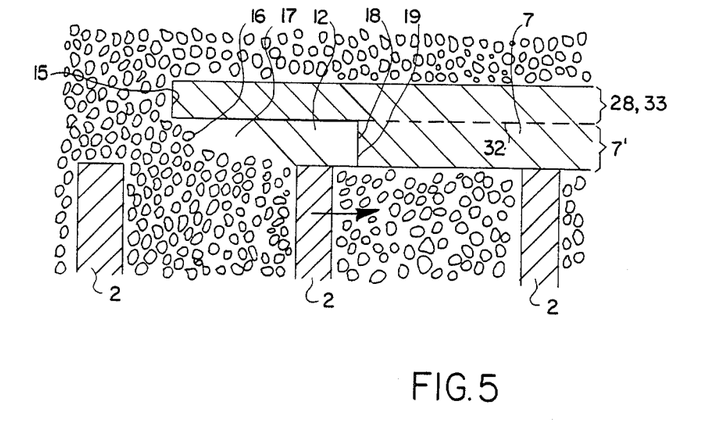
FIG. 5 is a longitudinal section along the line IV—IV in FIG. 2.
Figure 6:
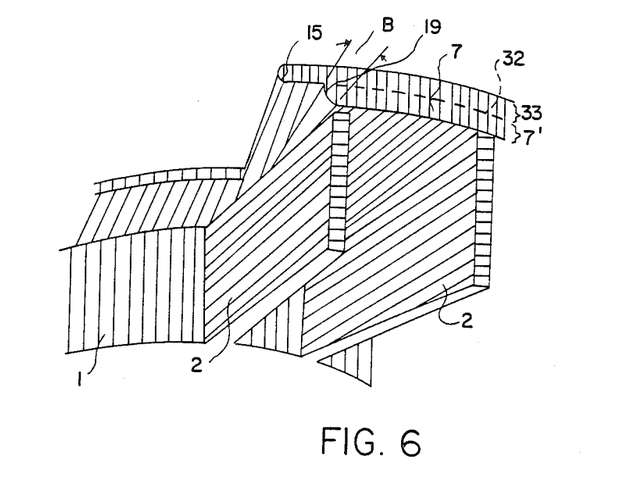
FIG. 6 is a sectional view of the device in a perspective projection.

The recess 12 in the cover plate 7 shown in FIG. 5 causes a material slope 16 and a space 17 radially inward of slope, to form under cover plate 7 in the recess 12. Individual particles 18, which are trapped between the paddles 2 and the edge 19 may be—as to be seen in FIGS. 1 and 3—swept into the space 14 when the rotor rotates, without scraping the particles. This process is shown perspectively in FIG. 6 showing the sweeping (stripping) edge 15 and 19 from below against the cover plate 7.

The clearance between the underside of the cover plate 7 and the top edge of the rotor paddles 2 in the region of the undercut recess 12 is dimensioned in such a way that the clearance is equal at least to the largest material particle diameter and is especially between 3 and 10 mm. The clearance between the underside of the cover plate 7 and the top edge of the rotor paddles 2 beyond the region of the recess 12 is approximately between 0.05 and 0.5 mm. In the preferred embodiment, the angle $\alpha$ is larger than 5° and preferably $\alpha \approx \beta \approx 30°$ to 40°, and especially 35°.

Figure 7:
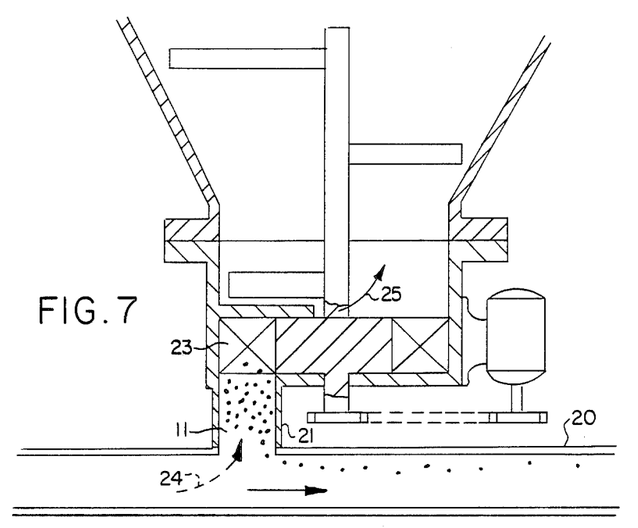
FIGS. 7, 7a, 8, and 9 illustrate connection possibilities of the device to a pneumatic conveying line.

FIG. 7 shows how the discharge outlet 11 of the metering device is practically connected to a pneumatic conveying line 20. When the rotor rotates slowly produce discharge is carried out almost exclusively by gravity, which means it is sufficient to develop the product discharge in the manner illustrated in FIG. 1 or FIG. 7, i.e., vertically downwards.

The development of the invention according to FIG. 7 has the disadvantage that when overpressure occurs in the pneumatic conveying line 20 a pressure drop exists between this line and the rotor chamber 23. This causes a certain amount of the conveying air to escape in the direction of arrow 24 into the metering device and hinder the material discharge flow. Arrow 25 indicates the further course of the "leakage" into the silo region.

The pressure difference between the pneumatic conveying line 20 and the rotor chamber 23 may be between 0.5 to 1 bar, according to the length of the conveying line 20 and the capacity of the pneumatic conveying system.

In order to eliminate this problem, there can be a pressure compensation line 26 provided according to the invention, which, when viewed in the flow direction 27, is situated in front of the discharge opening 11 and connects the conveying line 20 to the rotor chamber 23. In this case the same pressure prevails in this place and also in the rotor chamber and the conveying line 20, so that the material is able to be discharged freely without hinderance (see FIG. 7a).

Figure 8:
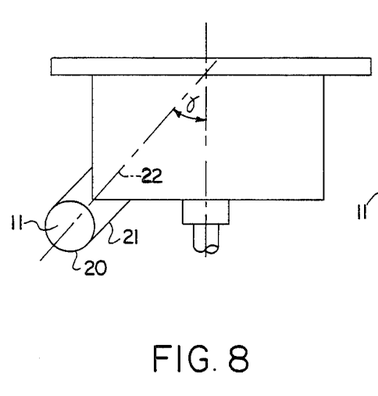
Figure 9:
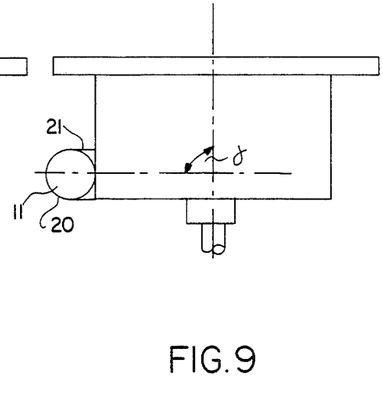

If the centrifugal force prevails during product discharge due to high rotor speed, it is practical to develop the outlet opening 11 according to either of the structures illustrated in FIGS. 8 and 9, i.e., with an inclined or horizontally arranged discharge opening 11 with connection nozzle 21 connected to the conveying line 20. The axis 22 of the outlet opening 11 can form an angle $\delta$ of between 0° and 90° with the center vertical.

Figure 1:
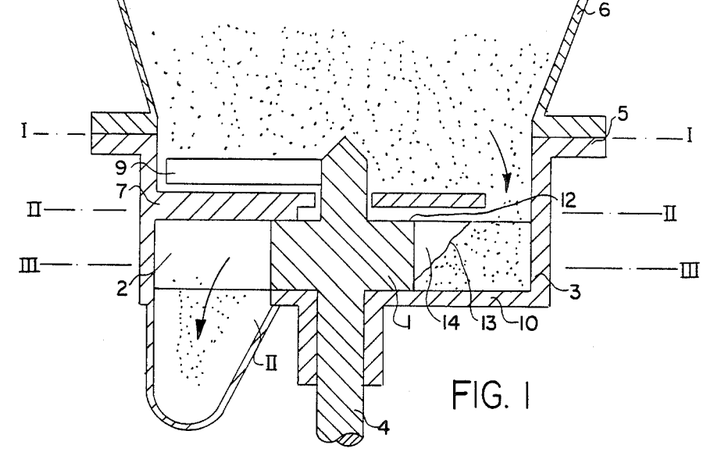
FIG. 1 is a longitudinal section of the device according to the invention.
Figure 2:
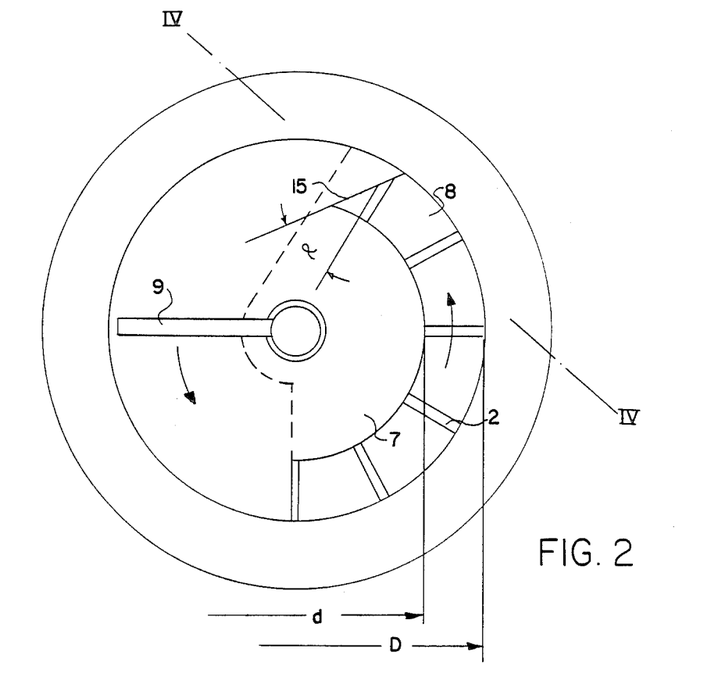
FIG. 2 is a cross section along the line I—I in FIG. 1.
Figure 3:
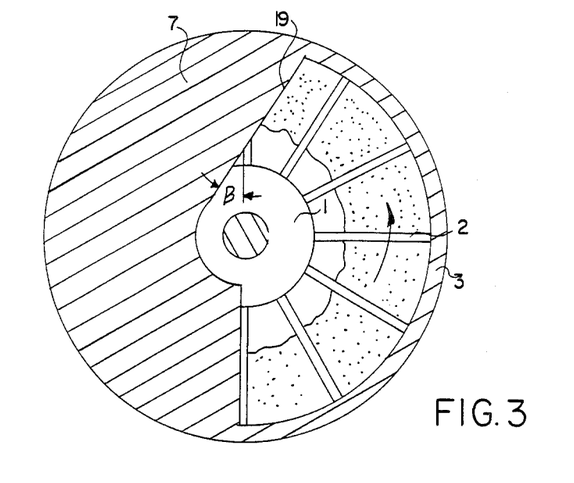
FIG. 3 is a cross section along the lines II—II in FIG. 1.
Figure 4:
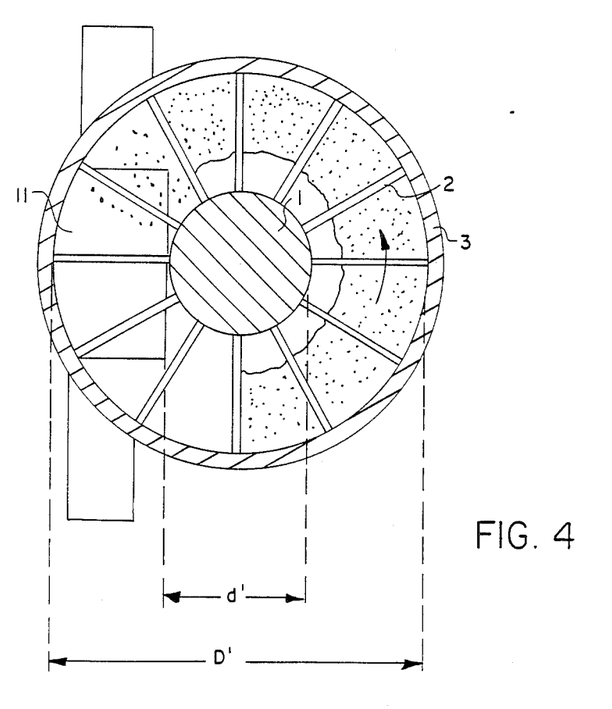
FIG. 4 is a cross section along the lines III—III in FIG. 1.

Between the devices according to FIGS. 1 or 7 and those in accordance with FIG. 9, construction types are possible which adopt various intermediate positions according to rotor velocity. This is shown in FIG. 8.

Figure 7A:
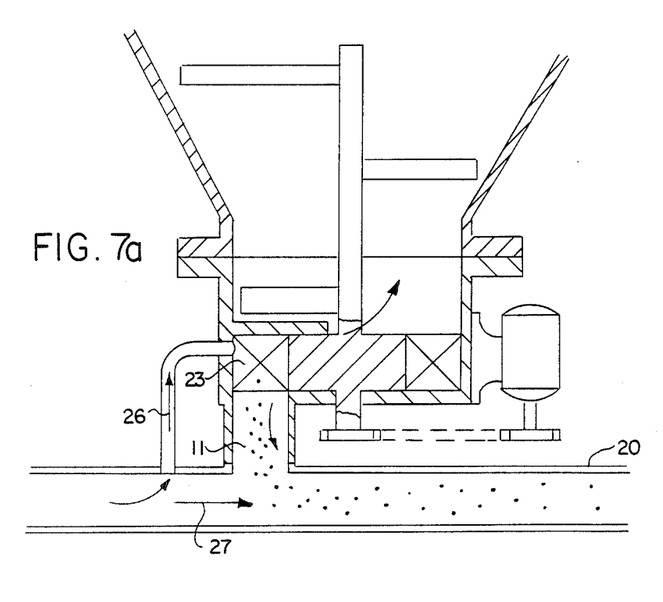
Figure 10:
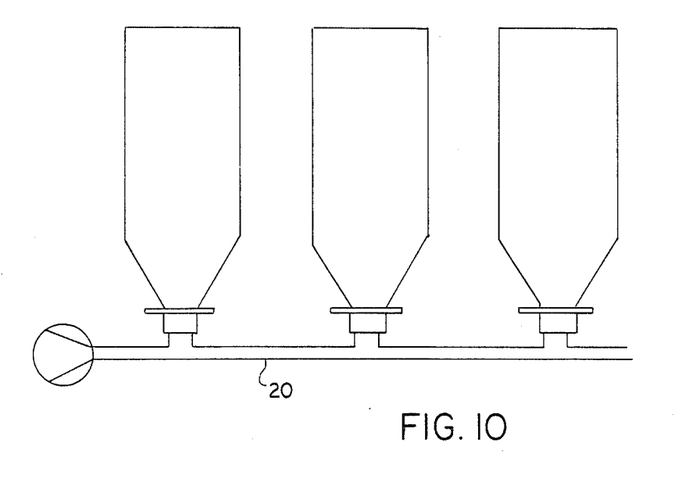
FIG. 10 illustrates several metering devices connected to a combined pneumatic conveying system.

In FIG. 10 it is demonstrated how several of the described metering units such as that illustrated in FIG. 7a may be used in series for supplying material into a combined conveying line.

Figure 11:
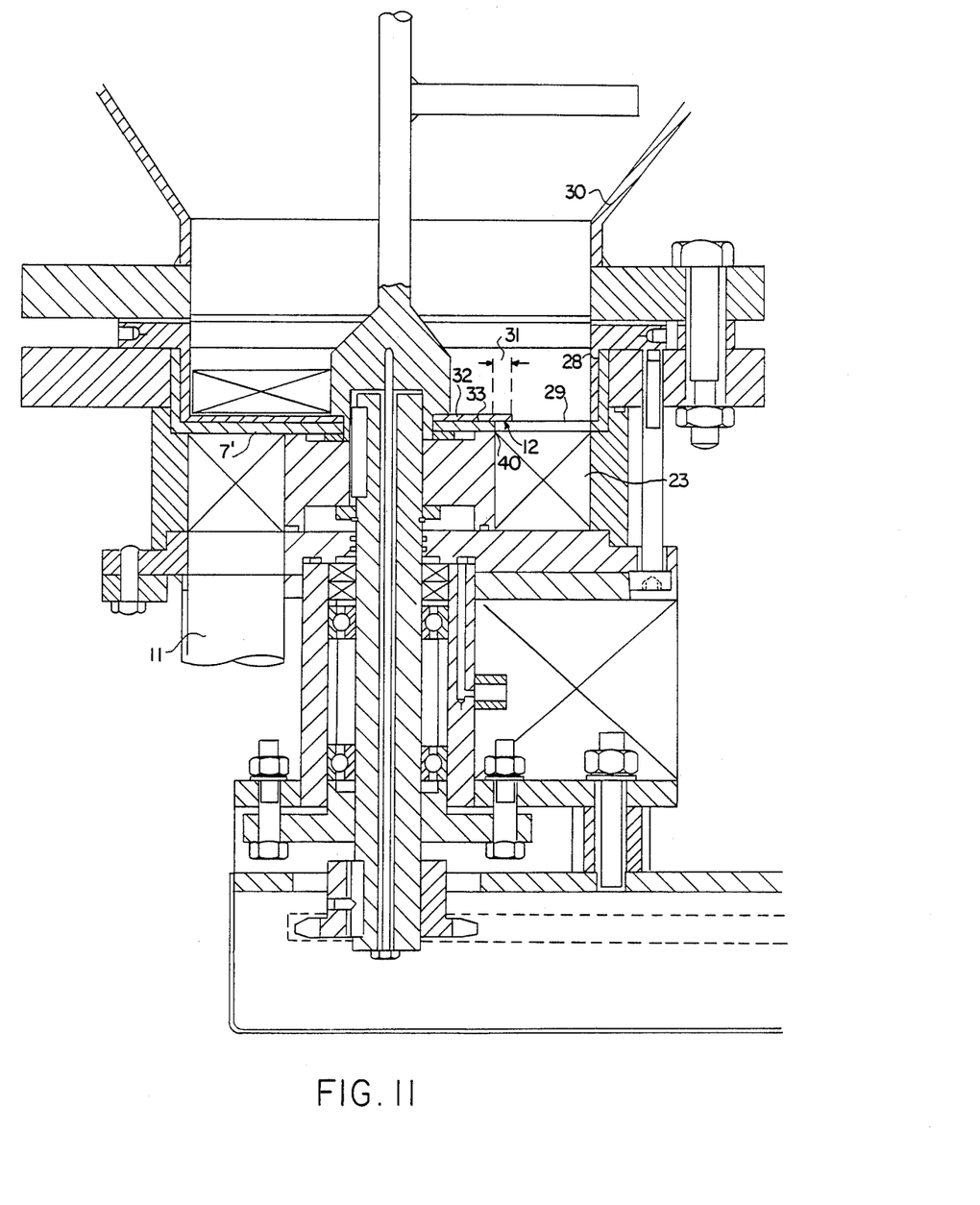
FIG. 11 illustrates in vertical cross section a closing device of the rotary valve housing.

The development of the invention according to the embodiment illustrated in FIG. 11 includes a closing device 28 which is constructed as a pan form rotary plate which includes a circular top plate 33 with at least one opening (aperture) 29, covering a bottom cover plate 7' having a ring segment shaped opening 40. By rotating the closing device mounted between two flanges, the opening 29 is moved to above the ring segment shaped opening (aperture) 40 in the cover plate 7'.

In order to separate silo 30 from the metering device, the closing device 28, and especially the circular disc-shaped bottom plate 33 with opening 29, is turned until the opening 29, 40 is closed.

According to the invention this construction type also has a protrusion 31 which is formed in the same way as described for FIGS. 5 and 6. Therefore, to make this clearer the separating edge 32 is shown in FIG. 5, which separates the bottom cover plate 7' and the top plate (circular disc 33). The circular disc 33 of the closing device 28 has at least one opening 29. Several openings are, however, possible, which allow a coarse flow setting of the metering process. The most important feature is, however, the possibility of closing the opening between silo 30 and rotor chamber 23.

I claim:
1. A device for metering bulk materials, comprising:
a cylindrical housing having a vertical center axis and a discharge opening;
a rotor of diameter D' rotatively mounted in said housing for rotation about said axis, said rotor including paddles extending to the radially outer periphery thereof and including a hub of outer diameter d' carrying said paddles in said housing, said paddles having top edges extending radially outwardly with respect to said axis; and
a cover plate covering said hub and said paddles, said cover plate having:

a cover plate opening therein in the shape of a segment of an annular ring having a first upper edge in the shape of a segment of a circle of diameter d centered on said axis, an outer boundary radially outside said first upper edge in the shape of a segment of a circle centered on said axis of diameter D greater than d and approximately equal to D', a second upper edge connecting said first upper edge and said outer boundary and extending over the rotary path of said paddles at a first acute angle $\alpha$ with respect to said top edges of said paddles as said paddles rotate therepast in said rotary path, and a third upper edge opposite said second upper edge, said diameter d of said first upper edge being greater than said outer diameter d' of said hub so as to define a first cavity in said housing below said cover plate, between said second and third upper edges, radially inside said first upper edge and radially outside said hub, and an undercut portion below said second upper edge, having a lower edge extending over the rotary path of said paddles at a second acute angle $\beta$ with respect to said top edges of said paddles as said paddles rotated therepast in said rotary path, said undercut portion being formed between said second upper edge and said lower edge and defining a second cavity therein between said undercut portion and the upper edges of said paddles, said second upper edge and said lower edge forming stripping edges which direct particles of the bulk material radially inwardly into said first and second cavities as said rotor rotates.

2. A device as in claim 1, further comprising a pneumatic conveying line, and a connecting chute connecting said discharge opening to said pneumatic conveying line.

3. A device as in claim 1, wherein said cover plate comprises a bottom plate having a bottom aperture therein and a top plate covering said bottom plate and having a top aperture therein, said top plate being rotatable about said axis between a closed position in which said top plate covers said bottom aperture and an open position in which said top and bottom apertures are substantially aligned, said top plate having said second upper edge, said bottom plate having said bottom edge, said second edge protruding slightly from said bottom edge over said bottom aperture to define said undercut recess when said top plate is in said open position.

4. A device as in claim 11, wherein in said undercut recess, said cover plate is vertically spaced from said upper edges of said paddles by a distance between 3 and 10 mm so as to provide clearance for the largest of the particles of the bulk material to pass therebetween.

5. A device as in claim 4, wherein beneath said cover plate beyond said undercut recess, said cover plate is vertically spaced from said upper edges of said paddles by a distance between 0.05 and 5 mm.

6. A device as in claim 1, wherein at least one of said first acute angle $\alpha$ and said second acute angle $\beta$ is larger than 5°.

7. A device as in claim 6, wherein said first acute angle $\alpha$ and said second acute angle $\beta$ are approximately equal to each other and approximately in the range 30° to 40°.

8. A device as in claim 6, wherein said first acute angle $\alpha$ and said second acute angle $\beta$ are approximately equal to each other and approximately equal to 35°.

9. A device for metering bulk materials, comprising:
a plurality of metering devices, each of said devices including
a cylindrical housing having a rotor chamber, a vertical center axis and a discharge opening;
a rotor of diametr D' rotatively mounted in said rotor chamber of said housing for rotation about said axis, said rotor including paddles extending to the radially outer periphery thereof and including a hub of outer diameter d' carrying said paddles in said housing, said paddles having top edges extending radially outwardly with respect to said axis; and
a cover plate covering said hub and said rotor, said cover plate having:
a cover plate opening therein in the shape of a segment of an annular ring having a first upper edge in the shape of a segment of a circle of diameter d centered on said axis, an outer boundary radially outside said first upper edge in the shape of a segment of a circle centered on said axis of diameter D greater than d and approximately equal to D', a second upper edge connecting said first upper edge and said outer boundary and extending over the rotary path of said paddles at a first acute angle $\alpha$ with respect to said top edges of said paddles as said paddles rotate therepast in said rotary path, and a third upper edge opposite said second upper edge, said diameter d of said first upper edge being greater than said outer diameter d' of said hub so as to define a first cavity in said housing below said cover plate, between said second and third upper edges, radially inside said first upper edge and radially outside said hub, and
an undercut portion below said second upper edge, having a lower edge extending over the rotary path of said paddles at a second acute angle $\beta$ with respect to said top edges of said paddles as said paddles rotated therepast in said rotary path, said undercut portion being formed between said second upper edge and said lower edge and defining a second cavity therein between said undercut portion and the upper edges of said paddles, said second upper edge and said lower edge forming stripping edges which direct particles of the bulk material radially inwardly into said first and second cavities as said rotor rotates;
a pneumatic conveying line coupled in series therealong to the discharge openings of said metering devices, for conveying discharged bulk materials in a downstream direction; and
a pressure compensation line connecting said rotor chamber of one of said metering devices to said conveying line upstream of said one of said metering devices.

10. A device for metering bulk materials, comprising:
a plurality of metering devices, each of said devices including
a cylindrical housing having a rotor chamber, a vertical center axis and a discharge opening;
a rotor of diameter D' rotatively mounted in said rotor chamber of said housing for rotation about said axis, said rotor including paddles extending to the radially outer periphery thereof and including a hub of outer diameter d' carrying said paddles in said housing, said paddles having top edges extending radially outwardly with respect to said axis; and a cover plate covering said hub and said paddles, said cover plate having:

a cover plate opening therein in the shape of a segment of an annular ring having a first upper edge in the shape of a segment of a circle of diameter d centered on said axis, an outer boundary radially outside said first upper edge in the shape of a segment of a circle centered on said axis of diameter D greater than d and approximately equal to D', a second upper edge connecting said first upper edge and said outer boundary and extending over the rotary path of said paddles at a first acute angle $\alpha$ with respect to said top edges of said paddles as said paddles rotate therepast in said rotary path, and a third upper edge opposite said second upper edge, said diameter d of said first upper edge being greater than said outer diameter d' of said hub so as to define a first cavity in said housing below said cover plate, between said second and third upper edges, radially inside said first upper edge and radially outside said hub, and an undercut portion below said second upper edge, having a lower edge extending over the rotary path of said paddles at a second acute angle $\beta$ with respect to said top edges of said paddles as said paddles rotated therepast in said rotary path, said undercut portion being formed between said second upper edge and said lower edge and defining a second cavity therein between said undercut portion and the upper edges of said paddles, said second upper edge and said lower edge forming stripping edges which direct particles of the bulk material radially inwardly into said first and second cavities;

a connecting chute connected to said discharge opening;

a pneumatic conveying line coupled in series therealong by said connecting chutes to the discharge openings of said metering devices, for conveying discharged bulk materials in a downstream direction; and a pressure compensation line connecting said rotor chamber of one of said metering devices to said conveying line upstream of said one of said metering devices.

* * * * *